(12) United States Patent
Li

(10) Patent No.: US 11,223,501 B2
(45) Date of Patent: Jan. 11, 2022

(54) INTELLIGENT COMMUNICATION GATEWAY DEVICE AND IMPLEMENTATION METHOD THEREOF

(71) Applicant: Animate Engineering Co., Ltd, Taichung (TW)

(72) Inventor: Chih-Chung Li, Taichung (TW)

(73) Assignee: ANIMATE ENGINEERING CO., LTD, Taichung (TW)

( * ) Notice: Subject to any disclaimer, the term of this patent is extended or adjusted under 35 U.S.C. 154(b) by 0 days.

(21) Appl. No.: 16/881,499

(22) Filed: May 22, 2020

(65) Prior Publication Data

US 2020/0389341 A1 Dec. 10, 2020

(30) Foreign Application Priority Data

May 24, 2019 (TW) ................................. 108118064

(51) Int. Cl.
*H04L 29/08* (2006.01)
*H04L 12/66* (2006.01)
*H04L 29/06* (2006.01)

(52) U.S. Cl.
CPC .............. *H04L 12/66* (2013.01); *H04L 67/12* (2013.01); *H04L 69/08* (2013.01)

(58) Field of Classification Search
CPC ......... H04L 12/66; H04L 67/12; H04L 69/08; H04L 67/10; H04L 67/125; H04L 69/18; H04W 4/38; H04W 4/70; H04W 88/16; H04W 4/80

See application file for complete search history.

(56) References Cited

U.S. PATENT DOCUMENTS

| 7,690,017 B2 * | 3/2010 | Stecyk ................ H04L 12/2805 725/80 |
| 9,661,079 B2 * | 5/2017 | Pulini ..................... H04L 67/12 |
| 2014/0285357 A1 | 9/2014 | Schlaeffer |

FOREIGN PATENT DOCUMENTS

| CN | 201758454 U | 3/2011 |
| CN | 203327040 U | 12/2013 |
| CN | 105259764 A | 1/2016 |
| TW | I440862 B | 6/2014 |
| TW | 201517553 A | 5/2015 |
| TW | M514041 U | 12/2015 |

\* cited by examiner

*Primary Examiner* — Kim T Nguyen
(74) *Attorney, Agent, or Firm* — Muncy, Geissler, Olds & Lowe, P.C.

(57) ABSTRACT

A communication gateway device is employed to receive and send received data to devices having different bottom-layer communication protocols, such that the devices having the different bottom-layer communication protocols can communicate with each other and send data to each other. The intelligent communication gateway device is present with several bottom-layer communication protocols such that the intelligent communication gateway device can directly communicate with the devices having different bottom-layer communication protocols. The data can be normalized by the intelligent communication gateway device such that the sent data can be correctly communicated under different communication protocol environments.

10 Claims, 6 Drawing Sheets

INTELLIGENT COMMUNICATION GATEWAY DEVICE AND IMPLEMENTATION METHOD THEREOF

BACKGROUND OF INVENTION

(1) Field of the Present Disclosure

The present disclosure relates to an intelligent communication gateway device, and more particularly to an intelligent communication gateway device capable of, after performing the data normalization, sending the normalized data to several different devices having bottom-layer communication protocols (such as Physical Layer) to achieve the multiple and uniform control of different platforms, devices, and the normalized communication protocols.

(2) Brief Description of Related Art

With the development of the Internet of Things, more and more home appliances can make use of the convenient functions of the Internet of Things, such as providing remote control, data monitoring, and searching for information. China. Patent No. CN105259764A "Mobile Household Appliance Management System and Device" discloses a household appliance management system, comprising a private cloud, a mobile device, and a public cloud. The private cloud includes a first household appliance and a wireless access point (which can be a gateway). The first household appliance can communicate with the wireless access point through a first communication protocol (such as Z-Wave). The mobile device can access the private cloud via the wireless access point, and then control the first household appliance through a software application (APP). The wireless access point can communicate with several household appliances through different communication protocols (such as Z-Wave, remote infrared, Wi-Fi, etc.). Related patent documents for reference are shown as follows:

Taiwan Patent No. TW201517553 "Information Notification Method";

Taiwan Patent No. TW1440862 "Electrical appliance detection method and system based on user feedback information";

Taiwan Patent No. TWMS 14041 "Communication Gateway for Smart Home Energy Saving Control";

China Patent No. CN203327040U "Cloud Computing Intelligent Gateway";

China Patent No. CN201758454U "New Smart Home System under Internet of Things"; and US Patent No. US20140285357A1 "System and method for analyzing the energy consumption of electric loads in a consumer network".

The aforementioned prior art mainly achieves the communication between a single mobile device and several household appliances through a wireless access point (such as gateway). However, the commercially available gateways are restricted by the bottom-layer communication drivers. The returned results are usually returned as continuous pure text messages with terminal command prompt characters. Accordingly, it is very difficult to process the returned messages. Moreover, the returned messages are also very difficult for reuse. Before the returned messages can be reused, they are required to be sorted out for temporary storage and then delivered to a logic gate. Although there are currently drivers that are directly programmed from a variety of C languages to achieve a method for obtaining the returned data, this method will cost a considerable amount of development and investment in writing a specific C++ program. Therefore, the general gateway is usually developed in the form of one-to-one communication protocol or a one-to-many communication protocol. However, if the gateway can be a "many-to-many integrated communication protocol gateway", the Internet of Things will be more convenient.

SUMMARY OF INVENTION

It is a primary object of the present disclosure to provide an intelligent communication gateway device and implementation method thereof for achieving the purpose of mutual communication under different bottom-layer communication protocol conditions.

According to the present disclosure, a communication gateway device is employed to send the received data to devices having different bottom-layer communication protocols, such that the devices having the different bottom-layer communication protocols can communicate with each other and send data to each other. The intelligent communication gateway device is preset with several bottom-layer communication protocols such that the intelligent communication gateway device can directly communicate with the devices having different bottom-layer communication protocols. Moreover, the data can be normalized by the intelligent communication gateway device such that the sent data can be correctly communicated under different communication protocol environments. The intelligent communication gateway device can be applied to data monitoring and involve a wide range of technical fields, such as monitoring and controlling agricultural sensors and equipment, smart home devices or household appliances, industrial sensors and equipment, commercial buildings, commercial performances, public infrastructures or facilities, etc. After the connection of the intelligent communication gateway device with the devices having different bottom-layer communication protocols is established, the normalized data can be communicated correctly even though the devices have different platforms nor bottom-layer communication protocols, thereby avoiding the developers investing time in writing special programs. Besides, the communication of multiple communication protocols to multiple communication protocols can be realized by the present disclosure.

DETAILED DESCRIPTION OF PREFERRED EMBODIMENTS

Figure 1:
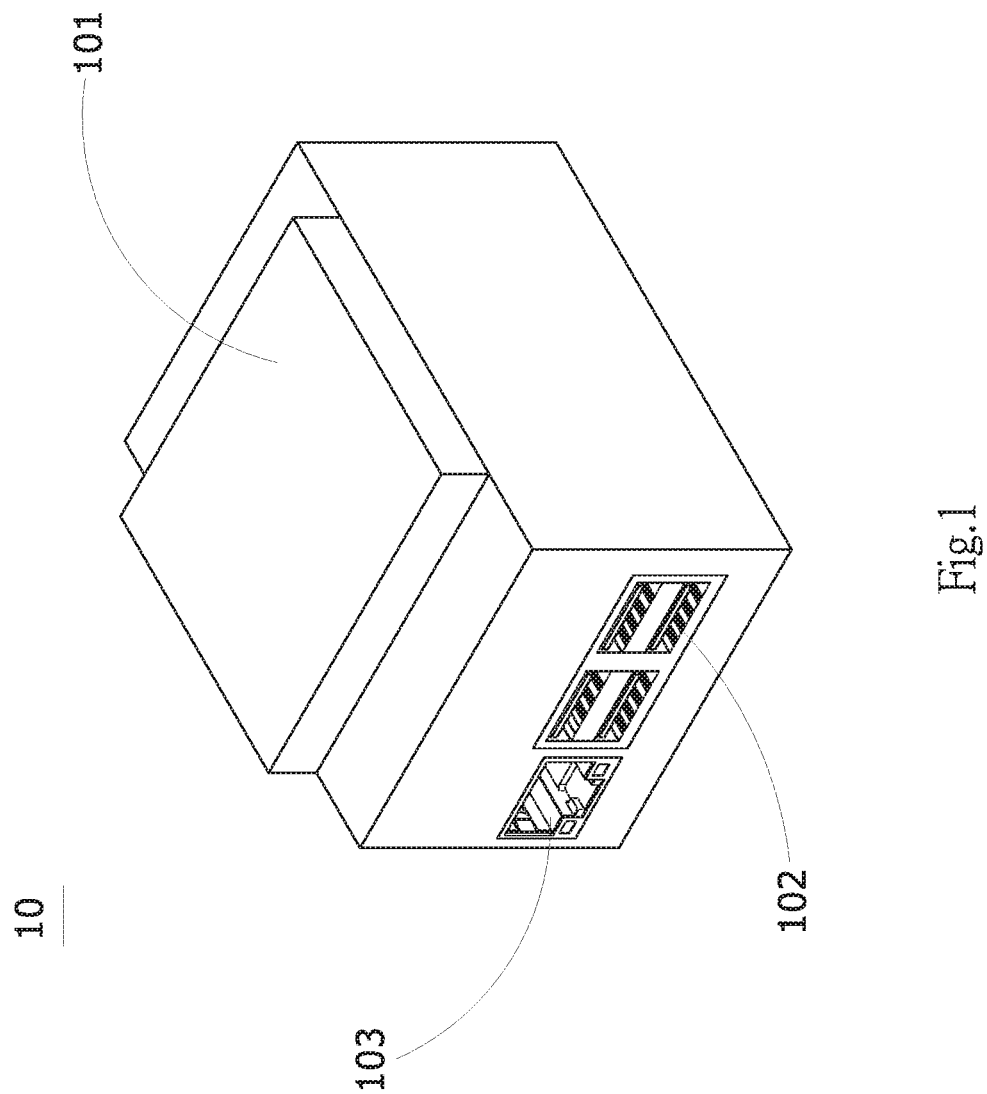
FIG. 1 is a perspective view of the communication gateway device of the present disclosure.

Regarding FIG. 1, an intelligent communication gateway device 10 according to the present disclosure includes an external housing 101. At least one information port 102 and at least one network port 103 are positioned within the external housing 101. The information port 102 allows the user to connect with an information connection plug having a corresponding specification, which can be selected from the group consisting of RS-232, RS-485, and universal serial bus. The intelligent communication gateway device 10 can be connected to the internet via the network port 103.

Figure 2:
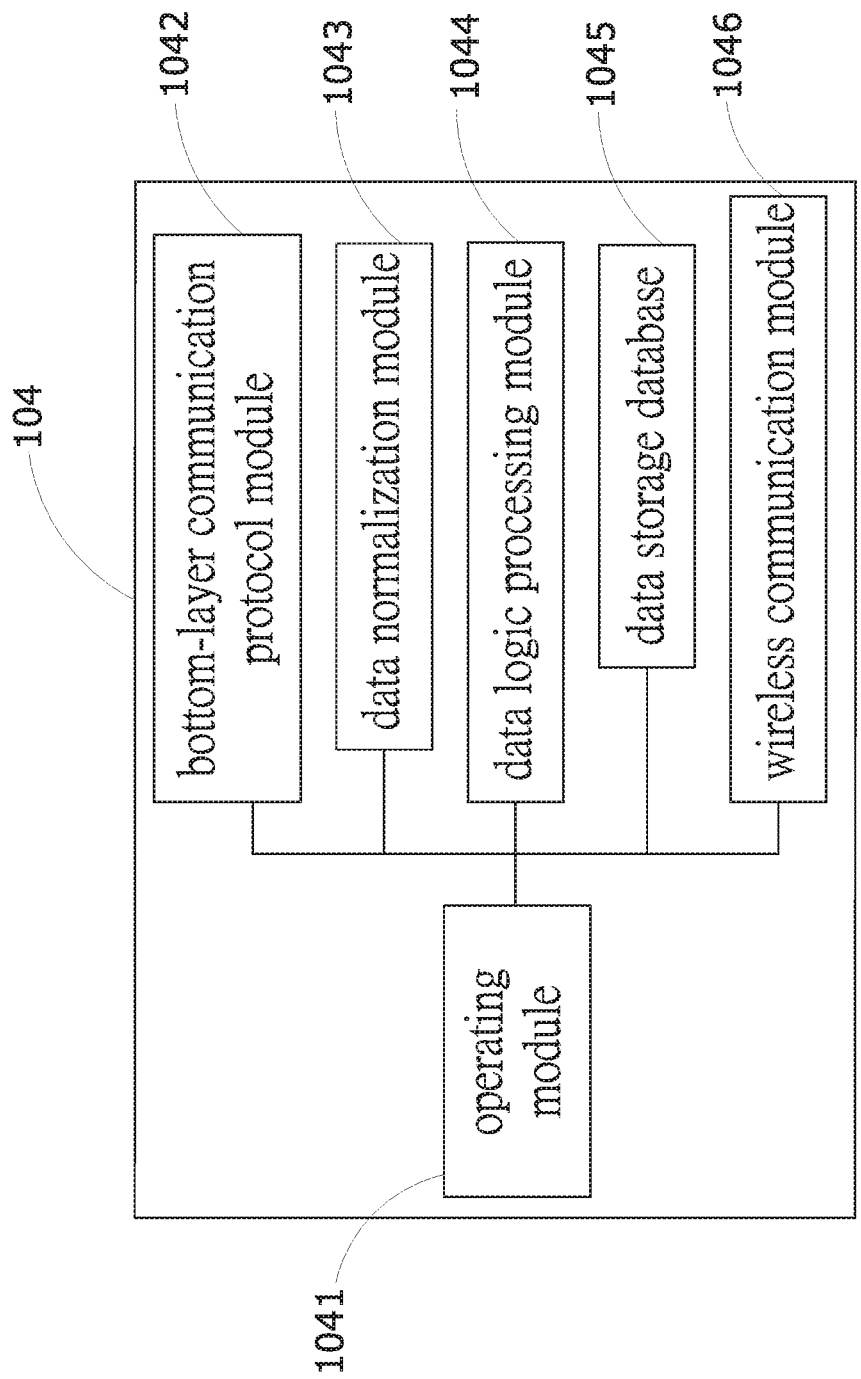
FIG. 2 is a schematic block diagram of the communication gateway device of the present disclosure.

Referring to FIG. 2 together with FIG. 2. A control circuit board 104 is disposed inside the external housing 101. The control circuit board 104 is in information connection with or coupled to the information port 102 and the network port 103. The control circuit board 104 includes an operating module 1041. A bottom-layer communication protocol module 1042, a data normalization module 1043, a data logic processing module 1044, a data storage database 1045, at least one wireless communication module 1046, the information port 102, and the network port 103 are in information connection with or coupled to the operating module 1041. The operating module 1041 is used for the operation of the intelligent communication gateway device 10, which may be a microprocessor or a microcontroller. The bottom-layer communication protocol module 1042 can be an integrated circuit, in which several bottom-layer communication protocols are preset. The bottom-layer communication protocols can include a serial communication protocol and a wireless communication protocol. The serial communication protocol is selected from a group consisting of RS-232, RS-485, universal serial bus, and Ethernet. The wireless communication protocol is selected from a group consisting of WI-FI, Bluetooth, Bluetooth Low Energy, ZigBee, and Z-Wave. The data normalization module 1043 is capable of normalizing data. The normalization can be realized by a method selected from a group consisting of log function conversion, ln function conversion, arctangent function conversion, abs absolute value, decimal scaling standardization, Logistic/Softmax conversion, fuzzy quantization mode, min-max standardization, and Z-score standardization. After the data is normalized, the processed data can improve the convergence speed and accuracy of the model. Moreover, the normalized data can be changed from dimensional expression to non-dimensional expression, therefore, can correctly communicate with each other between different devices with bottom-layer protocols. The data normalization module 1043 can be an integrated circuit, which includes a user interface. When the intelligent communication gateway device 10 communicates with information devices having different bottom-layer communication protocols, the intelligent communication gateway device 10 can send the user interface to the information devices such that the information devices having different bottom-layer communication protocols can display the normalized data contents and conduct the operation control between devices through the user interface to achieve the multiple and uniform control of platforms, devices, and the normalized communication protocols. The data logic processing module 1044 can be an integrated circuit for users to create at least one data processing logic, which is the data processing operation of the intelligent communication gateway device 10. The data processing logic includes a data processing operation, such as a data storage location or a data storage interval. The data storage database 1045 can be a memory module, a hard disk drive (HDD), and a solid-state drive (SSD) to store the received data. In the preferred embodiment, the data stored in the data storage database 1045 is the data that has been normalized by the data normalization module 1043. The wireless communication module 1046 includes at least two or more wireless transmission specifications, which can be any two or more wireless transmission specifications of a Win module, a Bluetooth transmission module, Bluetooth Low Energy, and a ZigBee and a Z-Wave transmission module.

Figure 3:
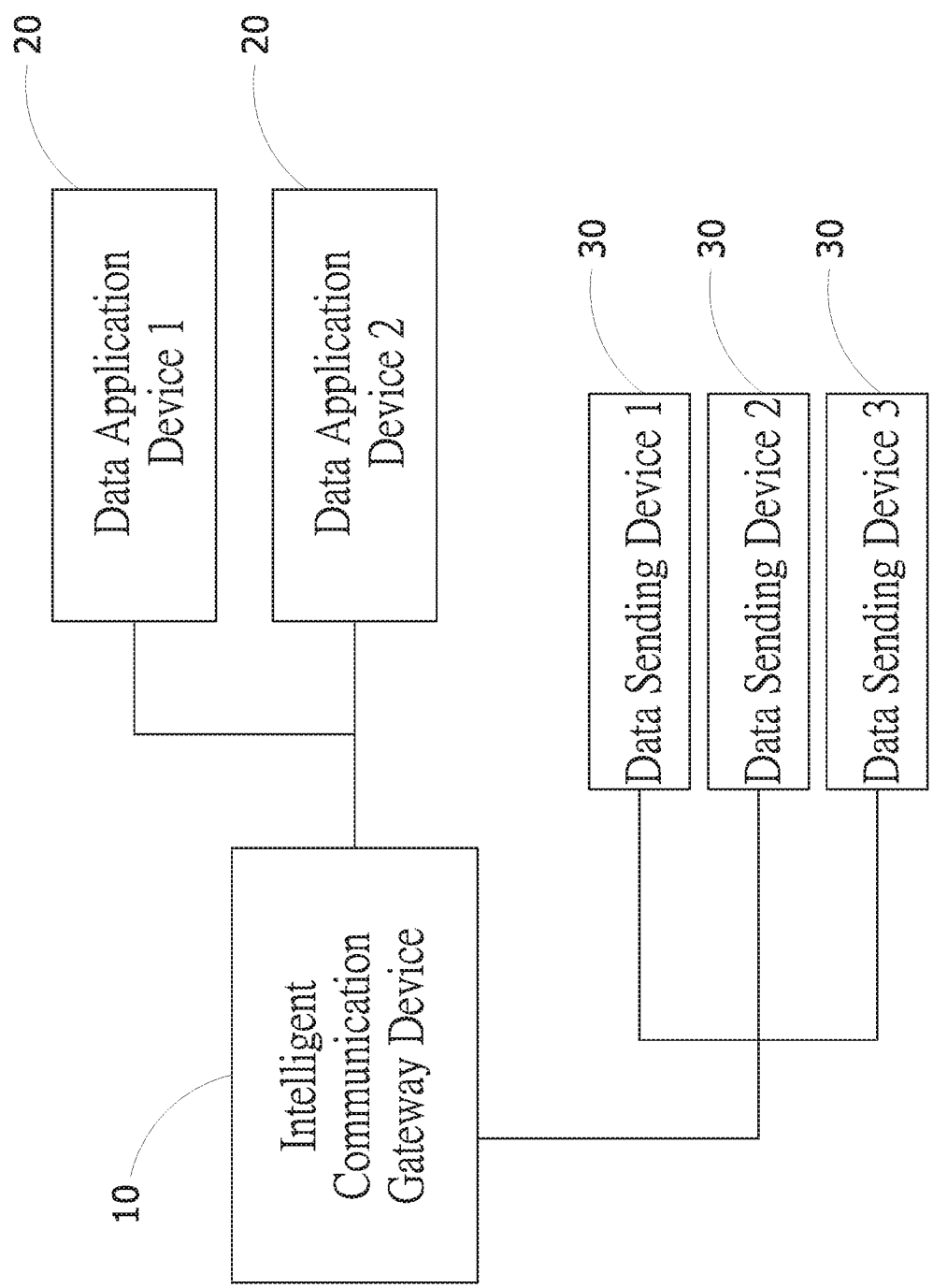
FIG. 3 is a block diagram 1 of the operation of the present disclosure.

Referring to FIG. 3, the intelligent communication gateway device 10 by the disclosure is in information connection with or coupled to at least one data application device 20 and at least one data sending device 30. The data application device 20 can be a smartphone, a wearable device, an embedded system, a computer device, or a cloud service device. Each data application device 20 has a bottom-layer communication protocol. The intelligent communication gateway device 10 can search and identify the bottom-layer communication protocol of the data application device 20. Moreover, the intelligent communication gateway device 10 can communicate with the data application device 20 based on the corresponding bottom-layer communication protocol. The data sending device 30 can send data to the intelligent communication gateway device 10. The data sent by the data sending device 30 may be an environment sensing data, a machine monitoring data, or a human-machine interface command. The data sending device 30 can generate corresponding data information according to the different usage situations. The data sending device 30 may be a temperature sensor, a humidity sensor, a pressure sensor, a voltage sensor or a current sensor, but not limited thereto.

Figure 4:
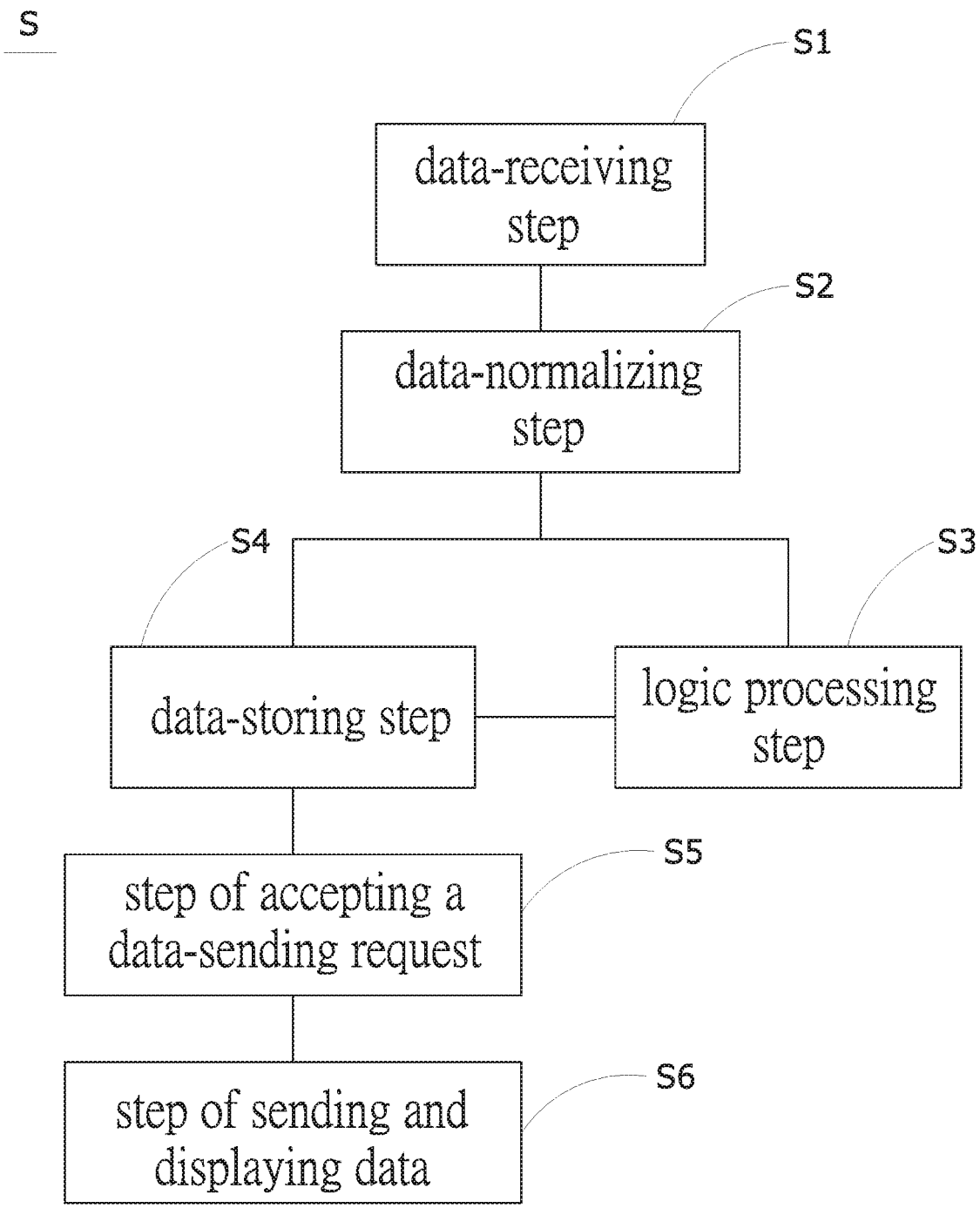
FIG. 4 is an implementation flow chart of the present disclosure.

Referring to FIG. 4, the method S for processing data includes the following steps.

a data-receiving step S1, wherein, after an intelligent communication gateway device 10 searches and finds at least one data sending device 30 and after the intelligent communication gateway device 10 is matched to a bottom-layer communication protocol of the data sending device 30, the intelligent communication gateway device 10 can communicate with the data sending device 30 so that the data sending device 30 may send the data to the intelligent communication gateway device 10;

a data-normalizing step S2, wherein, when the intelligent communication gateway device 10 continues to receive data sent by the data sending device 30, the intelligent communication gateway device 10 may normalize the data so that the normalized data can be created after the normalization process;

a logic processing step S3 for data, wherein, when the normalized data is created, the user may perform a mathematical operation on the normalized data alone or together with other data through a customized logic operation combination according to the needs to create a customized operation data. It should be noted that the step S3 is not necessarily but preferably included in the method so that the step S4 can be directly performed after the step S2 is completed;

a data-storing step S4, wherein, after completing the normalization process, the intelligent communication gateway device 10 stores the normalized data or the customized operation data;

a step S5 of accepting a data-sending request, wherein, after the data application device 20 is in information connection with or coupled to the intelligent communication gateway device 10, the intelligent communication gateway device 10 sends a user interface to the data application device 20 such that the data application device 20 can make a data-receiving request through the user interface;

a step S6 of sending and displaying data, wherein, after the intelligent communication gateway device 10 accepts the data-receiving request, the intelligent communication gateway device 10 can send the normalized data to the data application device 20 and display the normalized data on the user interface.

Figure 5:
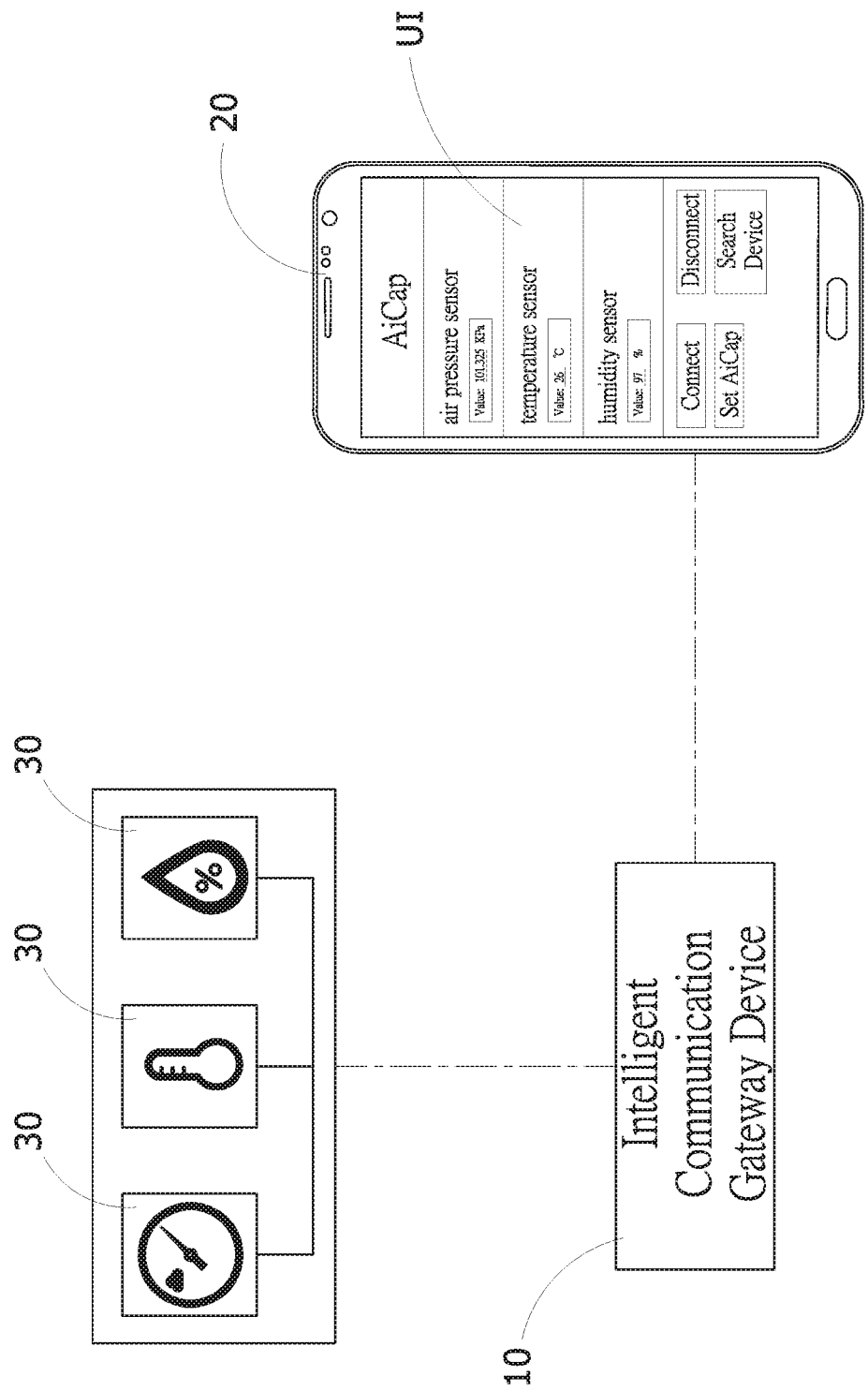
FIG. 5 is a block diagram II of the operation of the present disclosure.

Referring to FIG. 5, the intelligent communication gateway device 10 by the present disclosure can be applied to the agricultural field. During implementation, the intelligent communication gateway device 10 may be installed in a farming environment. The user can install the data sending device 30 according to the usage requirements. It should be noted that the data sending device 30 in this embodiment refers to sensors such as an air pressure sensor, a temperature sensor, a humidity sensor, an illuminance sensor, and a soil conductivity sensor shown in FIG. 5. As shown in FIG. 5, after the user completes the information connection of the intelligent communication gateway device 10 with the data application device 20 and the data sending device 30 as well as the setting thereof, the user can be connected to the intelligent communication gateway device 10 through the data application device 20 to obtain the data (such as air pressure data, temperature data, humidity data, illuminance data, and soil conductivity data) sent by the data sending devices 30, respectively. Since the intelligent communication gateway device 10 has processed the above-mentioned data into a normalized data, the intelligent communication gateway device 10 can send the normalized data to the data application device 20 and display the data on the user interface. In this way, the user can quickly view the data sent by each data sending device 30.

Figure 6:
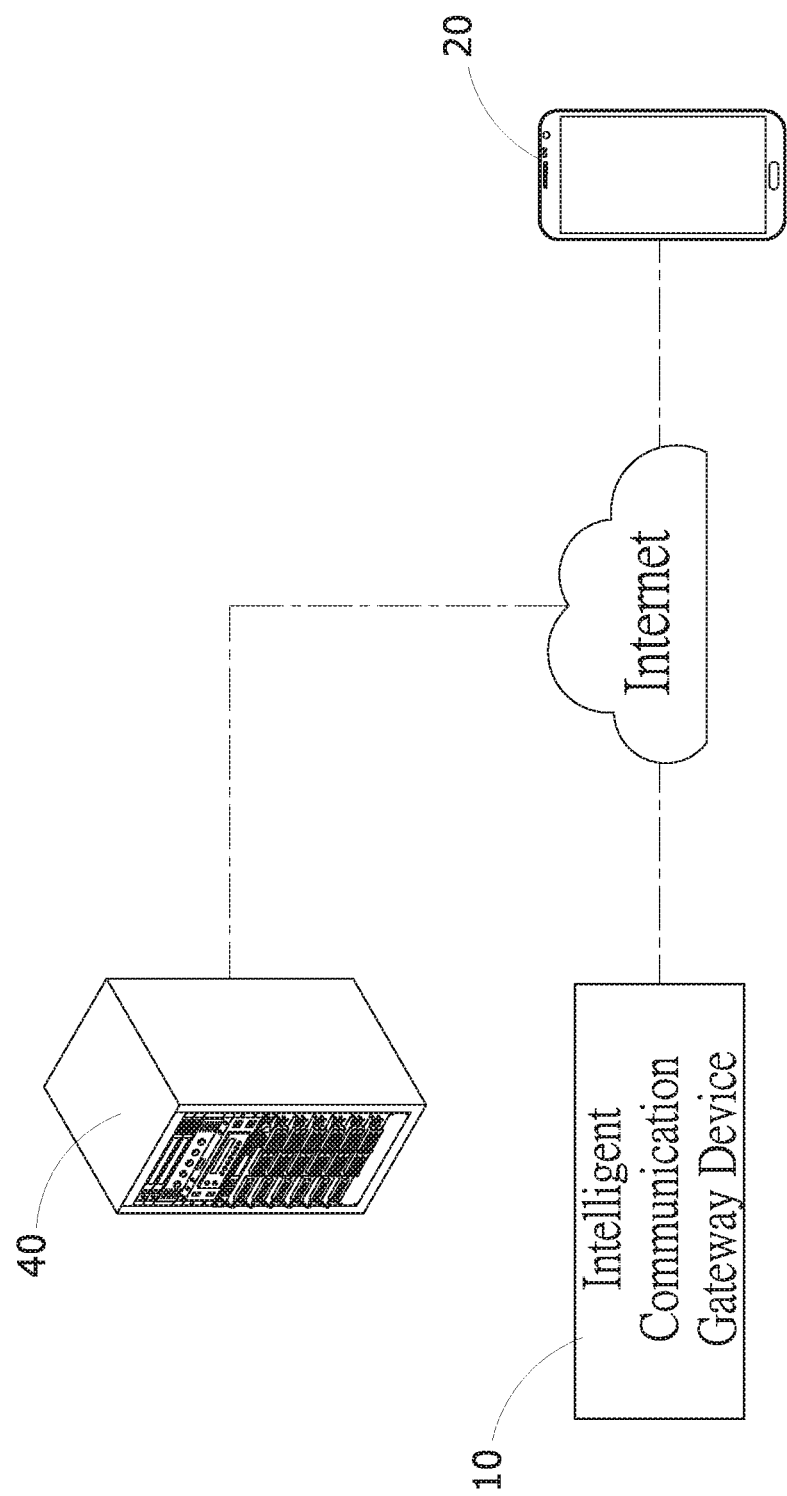
FIG. 6 is a schematic drawing of another embodiment of the present disclosure.

Referring to FIG. 6, the intelligent communication gateway device 10 can be in information connected to a cloud server 40 through the internet. The cloud server 40 can store the normalized data processed by the intelligent communication gateway device 10 and the customized operation data. When the user sets up the data processing logic through the data logic processing module 1044, the user can further set the data storage location to the cloud server 40 such that the intelligent communication gateway device 10 can send the normalized data to the cloud server 40 for storage via the internet. When the information connection between the intelligent communication gateway device 10 and the data application device 20 is completed, the intelligent communication gateway device 10 can download specified data from the cloud server 40 and send the data to the data application device 20 for display. In the way, the intelligent communication gateway device 10 can not only store the data in the data storage database 1045 (not shown in FIG. 6) but also store the data in the cloud server 40 synchronously. Even if undesired damage occurs in the data storage database 1045 in the future, the user can download the specified data from the cloud server 40 to achieve the data backup effect. The user can also give instructions to the cloud when away from home. The cloud server 40 will forward the instructions to the intelligent communication gateway device 10 through a dedicated encrypted transmission channel with the intelligent communication gateway device 10, to achieve the controllable effect at any time.

The intelligent communication gateway device 10 by the present disclosure is employed to send the received data to devices having different bottom-layer communication protocols, such that the devices having the different bottom-layer communication protocols can communicate with each other and send data to each other. The intelligent communication gateway device 10 includes an operating module 1041 to which a bottom-layer communication protocol module 1042, a data normalization module 1043, a data storage database 1045, a wireless communication module 1046 and a different network port 103 are in information connection.

The bottom-layer communication protocol module 1042 is preset with several bottom-layer communication protocols such that the intelligent communication gateway device 10 can directly communicate with the devices having different bottom-layer communication protocols. Moreover, the intelligent communication gateway device 10 can employ the data logic processing module for the user to create at least one set of data processing logic. The data can be communicated correctly under different communication protocol environments after the data is processed by the data normalization module 1043. Accordingly, the intelligent communication gateway device and implementation method thereof can achieve the purpose of the communication with each other under different communication protocol conditions.

While the present disclosure has been described by preferred embodiments in conjunction with accompanying drawings, it should be understood that the embodiments and the drawings are merely for descriptive and illustrative purposes, not intended for restriction of the scope of the present disclosure. Equivalent variations and modifications performed by the person skilled in the art without departing from the spirit and scope of the present disclosure should be considered to be still within the scope of the present disclosure.

What is claimed is:

1. An intelligent communication gateway device for receiving data and communicating the data with at least one data application device, comprising:
   a control circuit board having an operating module configured to operate the control circuit board;
   a bottom-layer communication protocol module being in connection with the operating module, the bottom-layer communication protocol module being present with at least one bottom-layer communication protocol;
   a data normalization module in connection with the operating module, the data normalization module configured to normalize the received data to create a normalized data; and
   a data storage database in connection with the operating module, the data storage database being employed to store at least one normalized data,
   wherein, after the at least one data application device requests communication with the intelligent communication gateway device and after the bottom-layer communication protocol module is matched to the bottom-layer communication protocol of each data application device, a user interface is sent to each data application device and the normalized data is displayed on the user interface.

2. The intelligent communication gateway device as recited in claim 1, wherein a wireless communication module is in connection with the operating module and wherein the wireless communication module communicates with the at least one data application device and at least one data sending device.

3. The intelligent communication gateway device as recited in claim 2, wherein the wireless communication module is one or a combination of any two or more of a WiFi module, a Bluetooth transmission module, a low-power Bluetooth, a ZigBee, and a Z-Wave transmission module.

4. The intelligent communication gateway device as recited in claim 1, wherein a data logic processing module is in connection with the operating module, and wherein the data logic processing module is used to create a data processing logic.

5. The intelligent communication gateway device as recited in claim 4, wherein the data processing logic includes one of data processing operations of a data storage location or a data storage interval.

6. The intelligent communication gateway device as recited in claim 1, wherein at least one information port is in connection with the operating module, and wherein the at least one information port is a combination of RS-232, RS-485, and universal serial bus.

7. The intelligent communication gateway device as recited in claim 1, wherein a network port is in connection with the operating module.

8. An implementation method of an intelligent communication gateway device for receiving data and communicating the data with at least one data application device, comprising:
   a data-receiving step, wherein, after the intelligent communication gateway device searches and finds at least one data sending device and after the intelligent communication gateway device is matched to a bottom-layer communication protocol of the at least one data sending device, the intelligent communication gateway device can communicate with the at least one data sending device so that the at least one data sending device may send the data to the intelligent communication gateway device;
   a data-normalizing step, wherein, when the intelligent communication gateway device continues to receive the data, the intelligent communication gateway device may normalize the data to create the normalized data;
   a data-storing step, wherein the intelligent communication gateway device stores the normalized data;
   a step of accepting a data-sending request, wherein, after the at least one data application device is in connection with the intelligent communication gateway device, the intelligent communication gateway device sends a user interface to the at least one data application device such that the at least one data application device can make a data-receiving request through the user interface; and
   a step of sending and displaying data, wherein, after the intelligent communication gateway device accepts the data-receiving request, the intelligent communication gateway device can send the normalized data to the data application device and display the normalized data on the user interface.

9. The implementation method as recited in claim 8, wherein, after the at least one data application device requests communication with the intelligent communication gateway device and after a bottom-layer communication protocol module is matched to the bottom-layer communication protocol of each data application device, the user interface is sent to the at least one data application device.

10. The implementation method as recited in claim 8, wherein the intelligent communication gateway device processes the normalized data based on a data processing logic.

* * * * *